(12) United States Patent
Kliger et al.

(10) Patent No.: US 10,237,824 B2
(45) Date of Patent: Mar. 19, 2019

(54) POWER EFFICIENT NETWORKING

(71) Applicant: BROADCOM CORPORATION, Irvine, CA (US)

(72) Inventors: Avraham Kliger, Ramat Gan (IL); Yitshak Ohana, Givat Zeev (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 125 days.

(21) Appl. No.: 15/080,442

(22) Filed: Mar. 24, 2016

(65) Prior Publication Data
US 2016/0286492 A1 Sep. 29, 2016

Related U.S. Application Data

(60) Provisional application No. 62/137,776, filed on Mar. 24, 2015.

(51) Int. Cl.
*H04W 52/02* (2009.01)
*H04W 76/27* (2018.01)

(52) U.S. Cl.
CPC ... *H04W 52/0235* (2013.01); *H04W 52/0219* (2013.01); *H04W 76/27* (2018.02); *Y02D 70/00* (2018.01); *Y02D 70/142* (2018.01); *Y02D 70/144* (2018.01); *Y02D 70/162* (2018.01); *Y02D 70/26* (2018.01)

(58) Field of Classification Search
CPC . H04W 24/00; H04W 52/02; H04W 52/0203; H04W 84/12; H04W 80/04; H04W 8/26; H04W 88/06; H04L 43/50; H04L 43/0852; H04L 43/08; H04B 17/003

USPC ..... 370/252, 311, 349, 328, 338, 310.2, 235
See application file for complete search history.

(56) References Cited

U.S. PATENT DOCUMENTS

| | | | | |
|---|---|---|---|---|
| 5,991,287 A | * | 11/1999 | Diepstraten | H04W 36/02 370/338 |
| 8,767,771 B1 | * | 7/2014 | Shukla | H04W 52/0216 370/468 |
| 9,787,463 B2 | * | 10/2017 | Ling | H04L 7/0033 |
| 9,912,466 B2 | * | 3/2018 | Ling | H04L 7/0033 |
| 2010/0122098 A1 | * | 5/2010 | Kay | G06F 1/3209 713/310 |
| 2013/0094415 A1 | * | 4/2013 | Ling | G06F 1/3209 370/311 |

* cited by examiner

*Primary Examiner* — Brenda H Pham
(74) *Attorney, Agent, or Firm* — Morgan, Lewis & Bockius LLP (57) ABSTRACT

A device for power efficient networking may include a processor circuit configured to identify a time to enter a low power state. The processor circuit may be further configured to transmit, prior to the identified time, transmission parameters to a network coordinator device for a network of devices, the transmission parameters being associated with a transmission from at least one of the devices to the device. The processor circuit may be further configured to enter the low power state at the identified time. The processor circuit may be further configured to, upon exiting the low power state, receive the transmission from at least one of the devices based at least in part on the transmission parameters. The processor circuit may be further configured to receive the transmission without participating in a node admission process after exiting the low power state.

20 Claims, 5 Drawing Sheets

| Field | Size (bits) |
|---|---|
| Bits per subcarrier | 4 |
| Power | 4 |
| CP Size | 4 |
| Preamble Type | 2 |
| FEC Rate | 2 |

POWER EFFICIENT NETWORKING

CROSS-REFERENCE TO RELATED APPLICATIONS

The present application claims the benefit of U.S. Provisional Patent Application Ser. No. 62/137,776, entitled "Power Efficient Networking," filed on Mar. 24, 2015, which is hereby incorporated by reference in its entirety for all purposes.

TECHNICAL FIELD

The present description relates generally to power efficient networking including power efficient multimedia over coax alliance (MoCA) networking.

BACKGROUND

A number of network devices, or network nodes, may communicate with one another over a network. When a new network device, or node, is added to an existing network, the new network device may participate in a node admission process in order to configure the network device for communication with the other devices in the network. The node admission process may include ranging, probe transmission, etc., in order to determine the appropriate transmission/reception parameters, i.e. PHY profile, for communicating with the other nodes in the network. If a network device temporarily leaves the network, or enters a low power state, the network device may need to re-participate in the node admission process upon rejoining the network, or exiting the low power state. The duration of the node admission process may result in latency before the network device is ready to communicate with the other devices in the network. Thus, the duration of the node admission process may reduce the time periods when it is practical for the network device to enter a low power mode.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
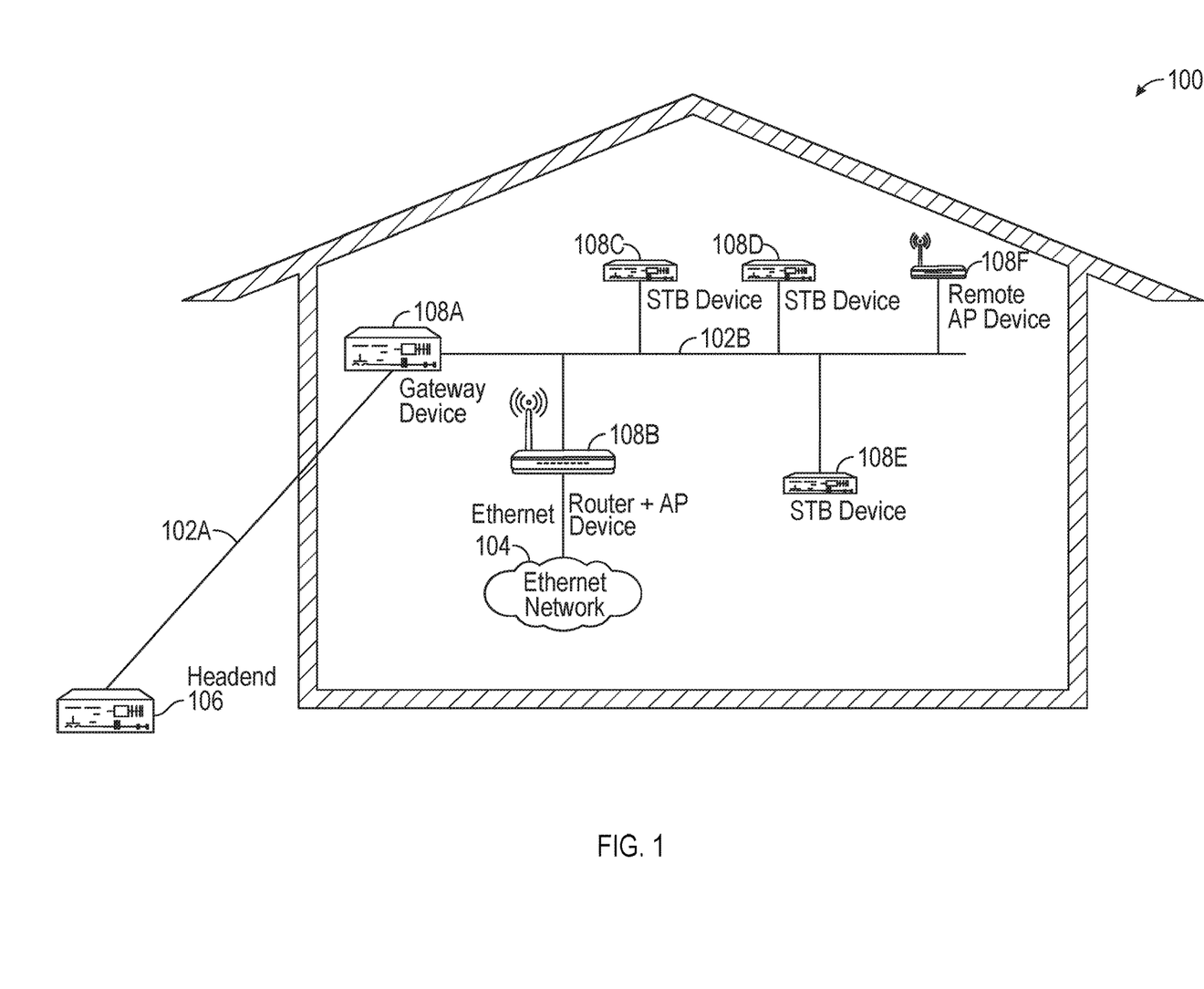
FIG. 1 illustrates an example network environment in which a system for power efficient networking may be implemented in accordance with one or more implementations.

FIG. 1 illustrates an example network environment 100 in which a system for power efficient networking may be implemented in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The network environment 100 includes a transmission medium 102A, a shared transmission medium 102B, a headed device 106, and one or more network devices 108A-F. The network device 108A is a gateway device, the network device 108B is a route device, the network devices 108C-E are set-top box devices, and the network device 108F is a wireless access point device. The network devices 108A-F communicate with each other over the shared transmission medium 102B, and the network device 108A communicates with the headed device 106 over the transmission medium 102A. The network device 108B and/or the network device 108F may support WiFi transmissions, such as 8×8 multiple-input multiple-output (MIMO) transmissions with a data rate of up to, for example, 10 Gigabits per second (Gbps). One or more of the devices 106, 108A-F may be and/or may include all or part of the electronic system discussed below with respect to FIG. 5.

The transmission media 102A-B may include one or more of a coaxial transmission medium, a powerline transmission medium, an Ethernet transmission medium, optical transmission medium, and/or one or more devices that facilitate communications over the transmission media 102A-B, such as splitters, diplexers, switches, etc. For example, the transmission medium 102A may include an optical transmission medium and the transmission medium 102B may include a coaxial transmission medium. In one or more implementations, the network device 108B may be further coupled to another network 104, e.g. an Ethernet network, via additional transmission media that is physically separate and/or physically different than the transmission media 102A-B.

In the network environment 100, one or more of the network devices 108A-F, such as the network device 108A, is designated as the network coordinator (NC) device for the network environment 100. For example, one or more of the network devices 108A-F may elect, or jointly decide which device will operate as the network coordinator device. The network coordinator device coordinates transmissions of the network devices 108A-F over the shared transmission medium 102B and coordinates admission of new network devices into the network environment 100. The transmissions of the network devices 108A-F over the shared transmission medium 102B may be temporally divided into time periods or time intervals which may be referred to as medium access plan (MAP) cycles.

For example, during a current MAP cycle the network devices 108A-F transmit bandwidth requests to the network coordinator device for bandwidth allocations during the subsequent MAP cycle. The network coordinator device allocates the bandwidth for the subsequent MAP cycle and transmits an indication of the bandwidth allocations to the devices network devices 108A-F over the shared transmission medium 102B during the current MAP cycle. The indication of the bandwidth allocations may be transmitted by the network coordinator device in a frame which may be referred to as a MAP frame and/or a resource allocation frame. The network devices 108A-F may then transmit data in the subsequent MAP cycle based on the bandwidth allocations indicated in the MAP frame.

The network device 108A is further coupled to the headed device 106 via the transmission medium 102A that is separate from the transmission medium 102B. The headed device 106 may include, for example, a video server that provides one or more audio and/or video streams to the network devices 108A-F. In the network environment 100, the network device 108A is in direct communication with the headed device 106, while the other network devices 108B-F communicate with the headed device 106 through the network device 108A. The headed device 106 may also couple the network device 108A (and indirectly the network devices 108B-F) to an external network, such as the Internet.

When a network device, such as the network device 108B, joins the network environment 100, the network device 108B participates in a node admission process. During the node admission process the network device 108B may, in coordination with the network coordinator device, determine the appropriate communication parameters for communicating with the other network devices 108A,C-F, e.g. based on link margins, channel conditions, etc. between the network device 108B and each of the other network devices 108A, C-F. The communication parameters may include, for example, per subcarrier bitloading, transmission power level, cyclic prefix size, preamble type, forward error correction code rate, etc. For example, the network device 108B may engage in ranging and/or probe transmission with one or more of the other network devices 108A,C-F in order to determine the appropriate communication parameters for communicating with each of the other network devices 108A,C-F. Thus, there may be a delay from the time when a network device joins the network environment 100 and the time when the network device may begin communicating with the network devices 108A-F of the network environment 100.

Similarly, if one of the network devices, such as the network device 108B leaves the network environment, or enters a low power mode/state, the network device 108B may need to re-perform the node admission process upon returning to the network environment 100 and/or upon entering an active power state. The latency associated with the node admission process may effectively limit the periods of time when the network devices 108A-F can utilize a low power mode. For example, if the amount of time available for a network device 108B to be in a low power mode is less than the amount of time required to perform the node admission process, then it may not be practical for the network device 108B to enter the low power mode. Accordingly, there may be several short time intervals during which the network devices 108A-F are effectively precluded from entering a low power mode.

In the subject system, a default or basic PHY profile is established for network devices 108A-F that are joining and/or re-joining the network environment 100, such as upon exiting a low power state. The basic profile may include adjustable values corresponding to one or more of a number of bits per subcarrier, a power level, a cyclic prefix size, a preamble type, a forward error correction (FEC) rate, and a bandwidth. The basic profile may be a robust profile with a low forward error correction code rate (e.g. low-density parity-check code rate) and/or a low constellation profile. Thus, a network device 108B re-entering the network environment 100 may immediately begin transmitting and/or receiving data with the other network devices 108A, C-F using the basic profile, bypassing the node admission process. The network device 108B may continue to use the basic profile until the first link maintenance operation (LMO), at which time the network device 108B may determine the appropriate communication parameters for communicating with each of the network devices 108A-F, e.g. as described above with respect to the node admission process. Alternatively, and/or in addition, the network device 108B may use the basic profile over a long period of time if a bitloading profile is not required, e.g. if the network device 108B has a low data rate to send and receive.

The basic profile used by the network device 108B for communications with each of the other network devices 108A,C-F in the network environment 100 may be the same. In addition, the bitloading used for the basic profile may be the same value across all of the subcarriers. In this manner, the amount of memory space required to store the basic profile used for communications with all of the other network devices 108A,C-F may be minimized, e.g. as opposed to storing different bitloadings for each subcarrier and different profiles for each of the other network devices 108A,C-F. The basic profile may allow for enough margin to account for some topology changes. For example, the basic profile may have, e.g., a bit loading of 4 bits for all of the subcarriers, and, e.g., a 75% code rate. Example parameters of an example basic profile are discussed further below with respect to FIG. 4.

The parameters of the basic profiles used by the network devices 108A-F may be set/configured in a number of different ways. For example, the network devices 108A-F may be preconfigured with parameters of the basic profiles, parameters of the basic profiles may be set/adjusted by the network coordinator device and provided to each of the network devices 108A-F, e.g. in a MAP frame, and/or parameters of the basic profile may be set/adjusted by each of the network devices 108A-F individually and relayed to the other network devices 108A-F by the network coordinator device, e.g. via a MAP frame. When the parameters of the basic profile are updated, each of the network devices 108A-F in a low power mode may be woken up to receive the updated basic profile, and/or the network coordinator device can wake all of the network devices 108A-F to perform LMO.

In the instance that the parameters of the basic profiles are set by each of the individual network devices 108A-F, the parameters of the basic profiles may be changed through the protocol information element (PIE) exchange through the reservation requests and the MAP frame. For example, a receiving network device 108A may send, to the network coordinator device, new basic profile parameters for a transmitting network device 108B via one or more reservation requests. The network coordinator may relay the new parameters for the basic profile to the transmitting network device 108B through a MAP frame. The transmitting network device 108B can transmit in reduced basic profile parameters (of the receiving network device 108A), e.g. for low power transmission. In one or more implementations, the MAP allocation element (AE) and the reservation request reservation element (RE) of each MAP frame may include the basic profile parameters and the receiving network device 108A may not store, and/or have memory of, the basic profile parameters. An example process of configuring the parameters of the basic profile is discussed further below with respect to FIG. 2.

Since the use of the basic profile allows for the node admission process to be bypassed when entering and/or re-entering the network environment 100, the use of the basic profile may allow for an additional power save mode during shorter low power intervals. The power save mode may be referred to as an "M0.5" power save mode. During the M0.5 power save mode, one or more of the network devices 108A-F, such as the network device 108B, may turn off its transceiver and listen to every N beacons, where N is any number. The beacons may be used to inform the network device 108B when it needs to wake-up, e.g. when another of the network devices 108A,C-F is ready to transmit data to the network device 108B. The network device 108B then wakes up within the first MAP cycle after being informed that it needs to wake up. After waking up, the network device 108B is immediately ready to receive data without having to re-perform the node admission process. The network device 108B uses the basic profile until the first LMO, and then may move to unicast profiles. An example process of using the basic profile to bypass node admission is discussed further below with respect to FIG. 3.

For example, the network coordinator, such as the network device 108A, may define parameters of the basic profile to be used to be used between itself and the network devices 108B-F for MAP frames, for a broadcast to power-saved mode relayed through the network coordinator, for unicast transmissions to/from network devices 108B-F in the M0.5 power save mode before they perform the first LMO after wake-up, and/or for multicast transmissions to groups that include one or more of the network devices 108B-F in the M0.5 power save mode before the first LMO. The network devices 108A-F may utilize the basic profile for unicast transmissions to/from one or more of the network devices 108A-F in the M0.5 power save mode before they perform the first LMO after wake-up, and for multicast transmissions to groups that include one or more of the network devices 108A-F in the M0.5 power save mode before the first LMO.

In order to further reduce power consumption, during an active state, or an active power mode, one or more of the network devices 108A-F may reduce their target PHY rate to increase power back-off. One or more of the network devices 108A-F may also use fewer subcarriers and/or narrow band transmissions in the active state, which may also be beneficial for low-power devices with a lower data rate. If one of the network devices 108A-F, such as the network device 108A, wants to establish a lower power transmission, it may advertise its maximum transmission power using a value that is less than its actual maximum transmission power. When a receiving device, such as one or more of the network devices 108B-F, creates parameters for the basic profile corresponding to the network device 108A, it may limit the transmission power to the maximum transmission power advertised by the network device 108A.

Figure 2:
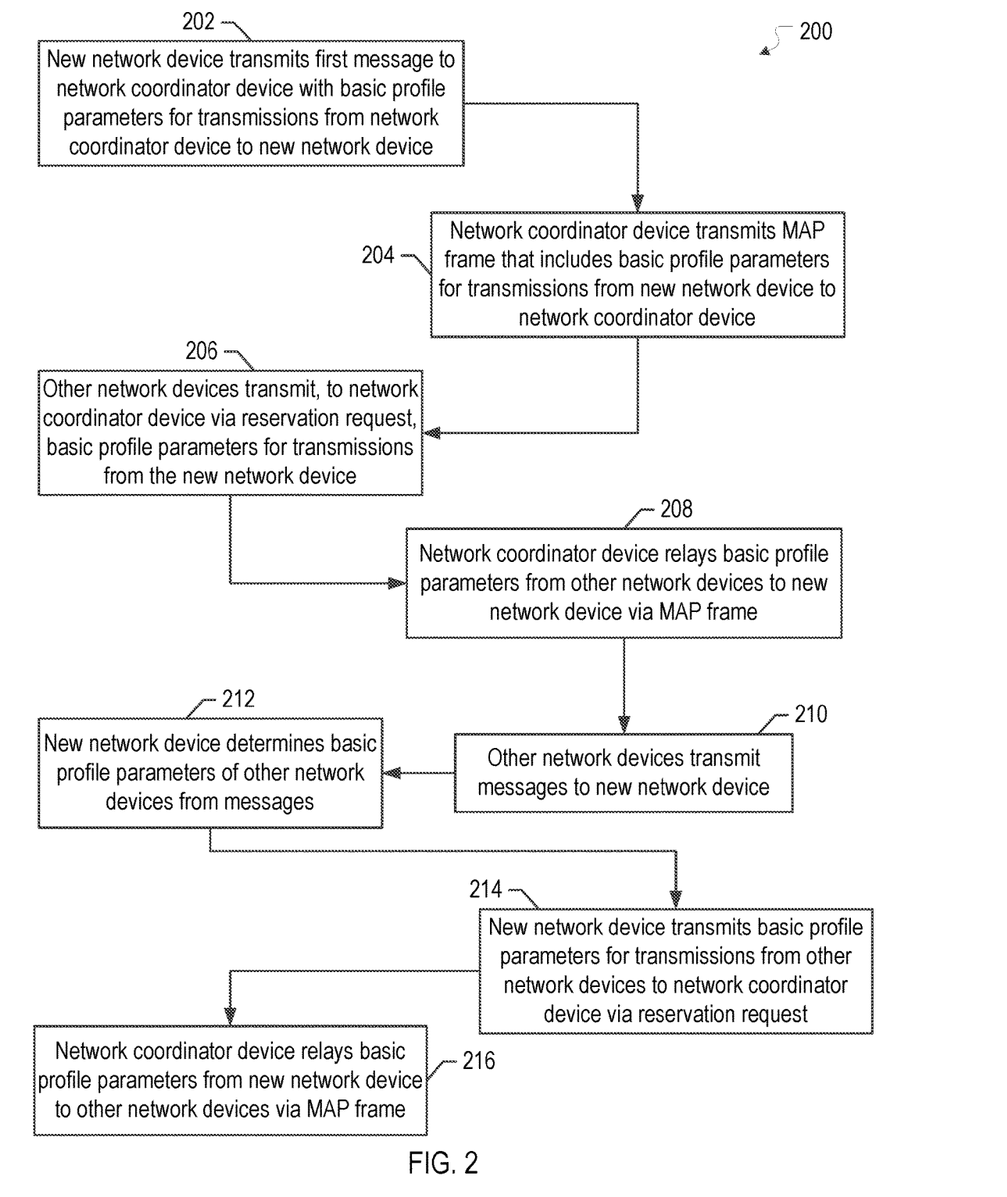
FIG. 2 illustrates a flow diagram of an example process of configuring parameters of a basic profile in accordance with one or more implementations.

FIG. 2 illustrates a flow diagram of an example process 200 of configuring parameters of a basic profile in accordance with one or more implementations. For explanatory purposes, the example process 200 is described herein with reference to the example network environment 100 of FIG. 1; however, the example process 200 is not limited to the example network environment 100 of FIG. 1. Further for explanatory purposes, the blocks of the example process 200 are described herein as occurring in serial, or linearly. However, multiple blocks of the example process 200 may occur in parallel. In addition, the blocks of the example process 200 need not be performed in the order shown and/or one or more of the blocks of the example process 200 need not be performed.

In the subject system, when one of the network devices 108A-F, such as the network device 108B, joins or re-joins the network environment 100, the network device 108B transmits a message to the network coordinator device, such as the network device 108A, that includes basic profile parameters for transmissions from the network coordinator device to the network device 108B (202). The network device 108B may transmit the message to the network coordinator device using a robust profile which may be a common profile used for all channels and receivers that is robust and has a low bit rate. The other network devices 108C-F may listen to the transmission and learn the basic profile parameters provided by the network device 108B, and/or the network device 108B may transmit the robust profile to the other network devices 108C-F.

After receiving the basic profile parameters from the network device 108B, the network coordinator device transmits the next resource allocation frame, such as a MAP frame, that includes basic profile parameters for transmissions from the network device 108B to the network coordinator device (204). In one or more implementations, the network coordinator device may transmit a beacon or some other message that includes the basic profile parameters for the resource allocation frame transmissions, such that the network device 108B knows how to receive the resource allocation frame transmission. After transmission of the resource allocation frame (204), the other network devices 108C-F in the network environment 100 then each transmit, to the network coordinator device, basic profile parameters to be used for transmissions from the network device 108A to each of the other network devices 108C-F (206). The network devices 108C-F may transmit their individual basic profile parameters to the network coordinator device via a reservation request. The network coordinator device relays the basic profile parameters from the other network devices 108C-F to the network device 108B via a subsequent resource allocation frame, such as a MAP frame (208).

After transmission of the resource allocation frame (208), the other network devices 108C-F each transmit individual messages to the network device 108B (210). The messages transmitted by the network devices 108C-F to the network device 108B may use the robust profile. The network device 108B determines basic profile parameters for transmissions from the network devices 108C-F to the network device 108B based at least in part on the received messages (212). For example, the network device 108B may determine channel state information from the received messages and may determine the basic profile parameters based at least in part on the channel state information.

The network device 108B then transmits, to the network coordinator device, the basic profile parameters for the transmissions from the other network devices 108C-F to the network device 108B (214). The network device 108B may, for example, transmit the basic profile parameters to the network coordinator device via one or more reservation requests. The network coordinator device relays the basic profile parameters received from the network device 108B to the other network devices 108C-F via a subsequent resource allocation frame, such as a subsequent MAP frame (216). The other network devices 108C-F, and the network device 108B, may receive the resource allocation frame that includes the basic profile parameters. Accordingly, the network device 108B can join the network and configure basic profile parameters for transmissions to/from the other network devices 108A,C-F without performing a node admission process, without performing a link maintenance operation, and without performing ranging, probe transmission, or the like.

Figure 3:
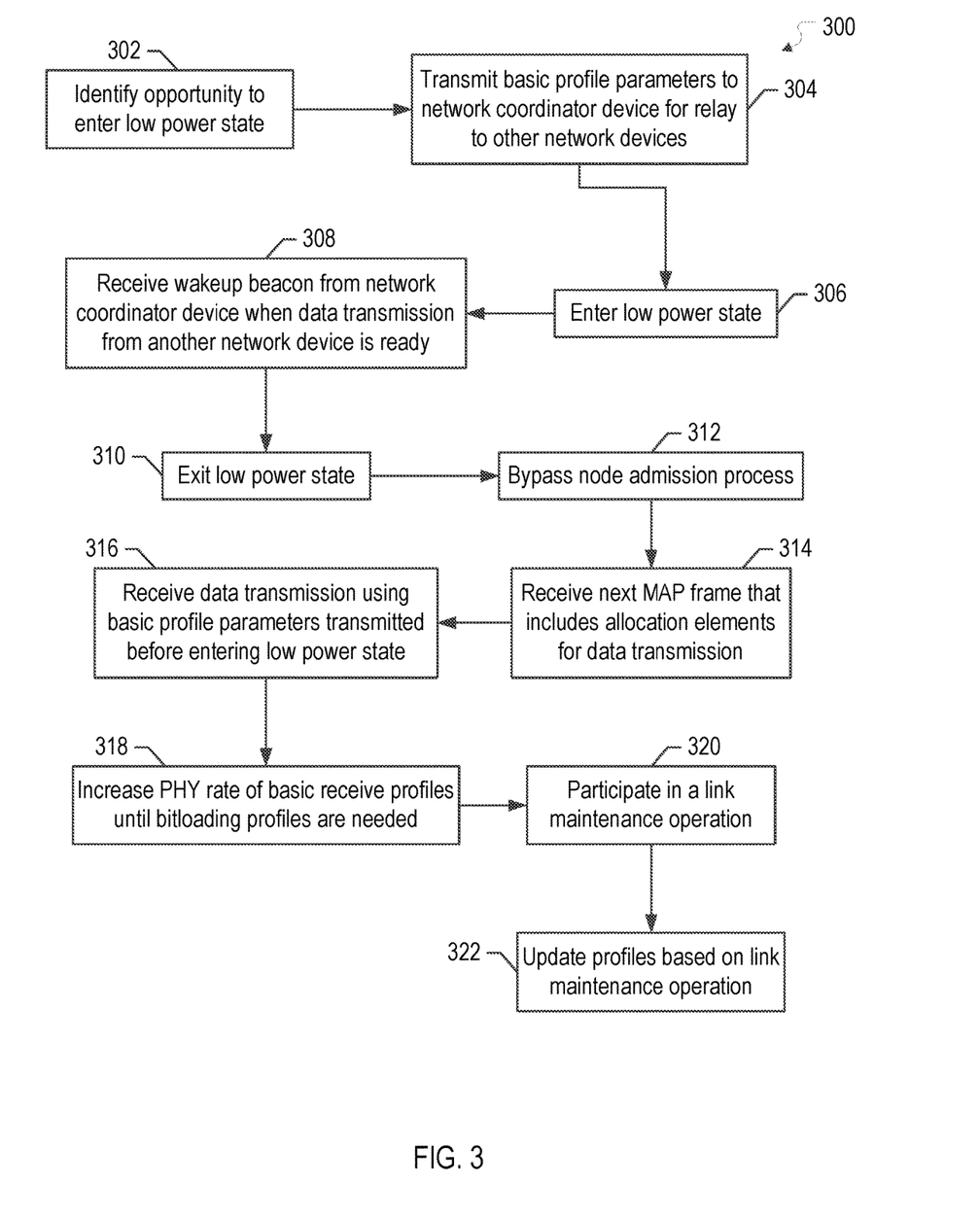
FIG. 3 illustrates a flow diagram of an example process of using a basic profile to bypass node admission after exiting a low power state in accordance with one or more implementations.

FIG. 3 illustrates a flow diagram of an example process 300 of using a basic profile to bypass node admission after exiting a low power state in accordance with one or more implementations. For explanatory purposes, the example process 300 is described herein with reference to the example network environment 100 of FIG. 1; however, the example process 300 is not limited to the example network environment 100 of FIG. 1. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

In the subject system, one or more existing network devices 108A-F in the network environment 100, such as the network device 108B, identifies an opportunity to enter a low power state (302). For example, the network device 108B may determine, e.g. based at least in part on resource allocation frames previously transmitted by the network coordinator device, that it is not scheduled to transmit or receive any data for a period of time and therefore can enter a low power state. At the time that the network device 108B identifies the opportunity to enter the low power state (302), the network device 108B may be using individual bitloading profiles for transmissions to/from the other network devices 108A,C-F. Thus, the network device 108B may transmit basic profile parameters to the network coordinator device, such as the network device 108A, to be relayed to the other network devices 108C-F, such as via a resource allocation frame (304). The basic profile parameters may differ from the individual bitloading profiles previously being used for transmissions to/from the network device 108B.

The network device 108B then enters the low power state (306), such as an M2 state, a powered off state, or any state in which power usage is reduced. Alternatively, and/or in addition, the network device 108B may leave the network environment 100, such as by moving out of range of, or disconnecting from, the network environment 100. When one of the other network devices 108C-F, such as the network device 108C, has data to transmit to the network device 108B, the network device 108C transmits an indication of the data to the network coordinator device, such as via a reservation request. The network coordinator device, responsive to receiving the reservation request from the network device 108C, transmits a wakeup beacon to the network device 108B.

The network device 108B, upon receiving the wakeup beacon from the network coordinator device (308), exits the low power state and return to an active state (310). Upon returning to the active state, the network device 108B bypasses a node admission process of the network environment 100, including bypassing link maintenance operations, ranging, probe transmission, and the like (312). The network device 108B receives the next resource allocation frame, such as MAP frame, transmitted by the network coordinator device (314). The resource allocation frame may include one or more allocation elements for receiving the data transmission from the network device 108C, such as a time allocated for the transmission, a frequency allocated for the transmission, etc.

The network device 108B receives the data transmission from the network device 108C using the basic profile parameters that were transmitted by the network device 108B prior to entering the low power state and based at least in part on the one or more allocation elements (316). Thus, the network device 108B receives the data transmission from the network device 108C after exiting the low power state (310) and prior to participating in any link maintenance operations with the network device 108C, such as probe transmission, ranging, etc. The network device 108B may subsequently increase the PHY rate of the basic receive profile parameters until bitloading profiles are needed (318). For example, the network device 108B may increase the PHY rate until a bit error rate (BER) of the received transmissions satisfies or exceeds a threshold. If the network device 108B fails to receive transmissions from one or more of the other network devices 108A,C-F when using the basic profile, due to, for example, a change in the physical path characteristics, the network device 108B may start the normal admission and/or LMO processes.

After the network device 108B determines that bitloading profiles are needed (318), e.g. based at least in part on the BER of the received transmissions, the network device 108B participates in a link maintenance operation (320). During the link maintenance operation, ranging, probe transmission, and/or similar tasks may be performed to determine the appropriate bitloading profiles for transmissions to/from the network device 108B. The network device 108B may update its transmit and receive profiles based at least in part on the link maintenance operation (322). The other network devices 108A,C-F may similarly update their profiles with respect to the network device 108B based at least in part on the link maintenance operation.

Figure 4:
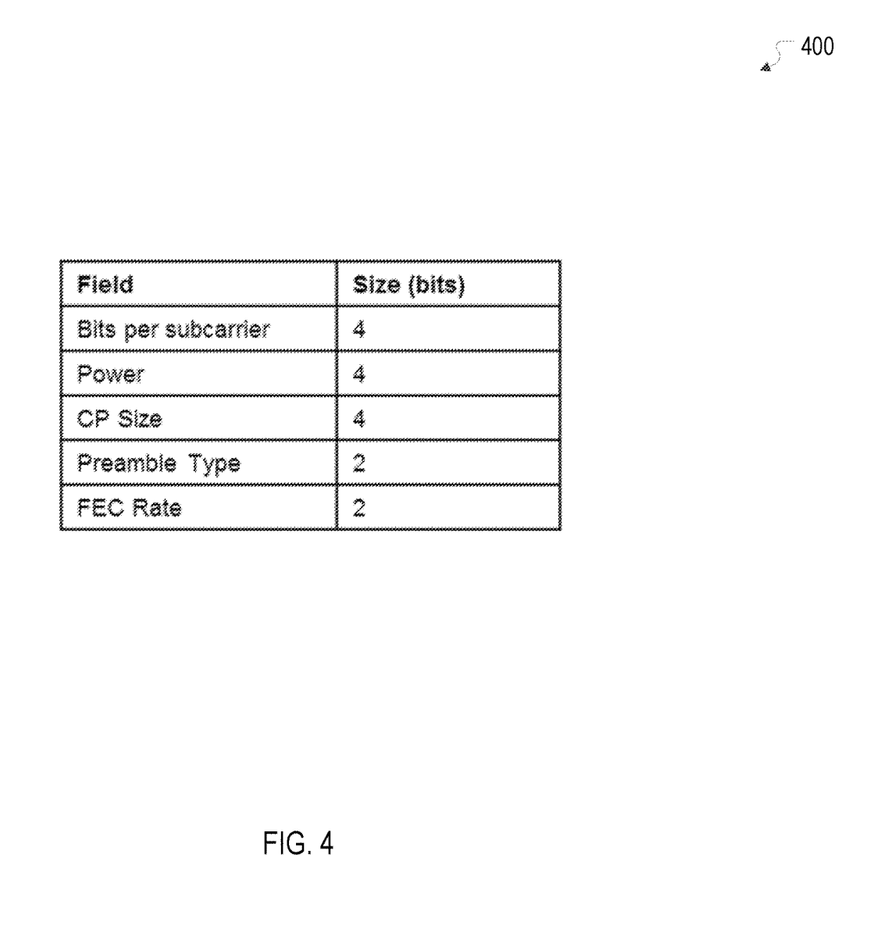
FIG. 4 illustrates a table of example encoding of basic profile parameters in accordance with one or more implementations.

FIG. 4 illustrates a table 400 of example encoding of basic profile parameters in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The table 400 lists example encoding of the basic profile parameters that includes 4 bits allocated to the number of bits per subcarrier, 4 bits allocated to the power, 4 bits allocated to the cyclic prefix (CP) size, 2 bits allocated to the preamble type, and 2 bits allocated to the forward error correction (FEC) code rate for a total of 16 bits. The basic profile parameters may use a common bit loading for all subcarriers. Thus, the value of the bits per subcarrier field may be applied to all of the subcarriers. The power field may use a 2 decibel step size, and the CP size may use coarse steps. The FEC code rate potions may include, for example, 85%, 75%, 65%, or generally any code rate.

Figure 5:
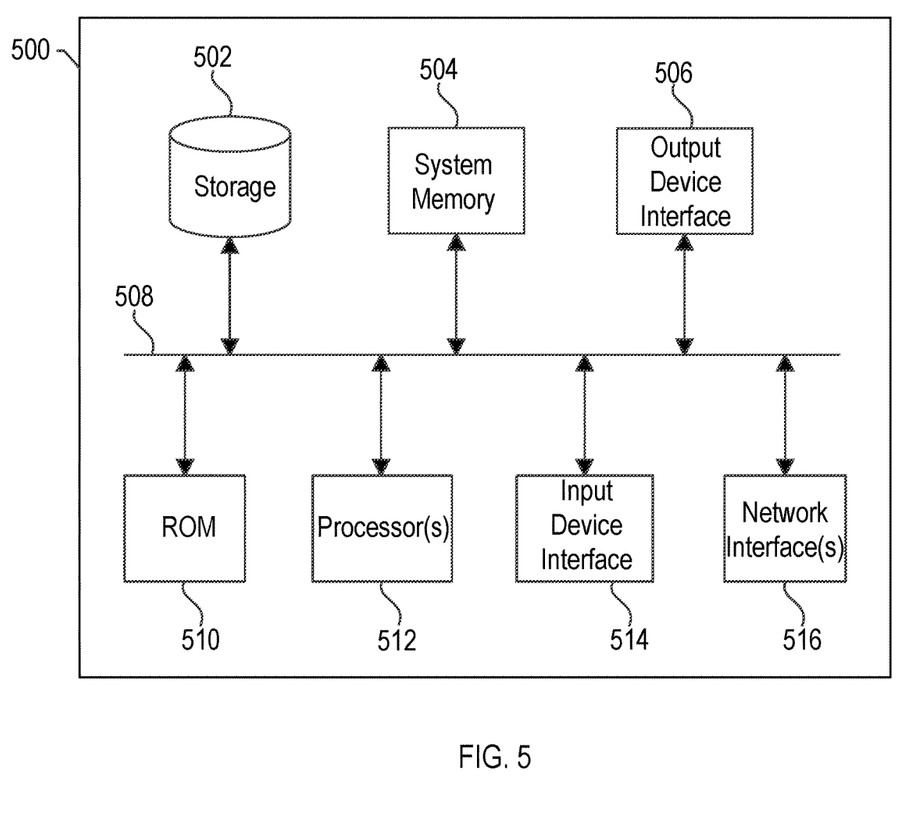
FIG. 5 conceptually illustrates an example electronic system with which one or more implementations of the subject technology can be implemented.

FIG. 5 conceptually illustrates an example of an electronic system 500 with which one or more implementations of the subject technology can be implemented. The electronic system 500, for example, may be, or may include, one or more of the devices 106, 108A-F, such as a desktop computer, a laptop computer, a tablet computer, a phone, a gateway device, a set-top-box, and/or generally any electronic device. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, such as a prism projector that may be included in a smart glasses device, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include an Ethernet interface, a WiFi interface, a Bluetooth interface, a Zigbee interface, a multimedia over coax alliance (MoCA) interface, a reduced gigabit media independent interface (RGMII), or generally any interface for connecting to a network. In this manner, electronic system 500 can be a part of one or more networks of computers (such as a local area network (LAN), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    at least one processor circuit configured to:
        identify a time to enter a low power state;
        transmit, prior to the identified time, transmission parameters to a network coordinator device for a network of devices, the transmission parameters being associated with a transmission from at least one of the devices to the device;
        enter the low power state at the identified time; and
        upon exiting the low power state, receive the transmission from the at least one of the devices based at least in part on the transmission parameters.

2. The device of claim 1, wherein the at least one processor circuit is further configured to:
    bypass a node admission process upon exiting the low power state and before receiving the transmission from the at least one of the devices.

3. The device of claim 2, wherein the at least one processor circuit is further configured to:
perform at least one of the node admission process or a link maintenance operation process when the transmission is not received from the at least one of the devices based at least in part on the transmission parameters.

4. The device of claim 1, wherein the transmission parameters are relayed to the devices of the network via the network coordinator device.

5. The device of claim 1, wherein the at least one processor circuit is further configured to:
receive a beacon transmitted by the network coordinator device while in the low power state, the beacon including an indication to wake-up responsive to the network coordinator device receiving another indication that the at least one of the devices is ready to transmit the transmission; and
exit the low power state responsive to receiving the indication to wake-up in the beacon.

6. The device of claim 5, wherein the at least one processor circuit is further configured to:
receive a next resource allocation frame transmitted by the network coordinator device subsequent to the beacon including the indication to wake-up, wherein the next resource allocation frame comprises a resource allocation element corresponding to the transmission; and
receive the transmission from the at least one of the devices based at least in part on the resource allocation element and the transmission parameters.

7. The device of claim 1, wherein the at least one processor circuit is further configured to:
increase a transmission rate corresponding to subsequent transmission received from the at least one of the devices until a bit error rate associated with the at least one of the devices reaches a threshold.

8. The device of claim 1, wherein the at least one processor circuit is further configured to:
participate in a link maintenance operation subsequent to receiving the transmission from the at least one of the devices; and
update the transmission parameters based at least in part on the link maintenance operation.

9. The device of claim 8, wherein the transmission parameters comprise a same bitloading for each subcarrier and the updated transmission parameters comprise a different bitloading for at least two subcarriers.

10. The device of claim 1, wherein the at least one processor circuit is further configured to:
receive the transmission from the at least one of the devices based at least in part on the transmission parameters upon exiting the low power state and prior to receiving a probe from the at least one of the devices.

11. A method comprising:
transmitting, by a first device of a network of devices to a network coordinator device of the network of devices, a first message comprising first transmission parameters for first transmissions from the network coordinator device to the first device;
receiving, by the first device and from the network coordinator, a first resource allocation frame that comprises second transmission parameters for second transmissions from the first device to the network coordinator device and a second resource allocation frame that comprises third transmission parameters for second transmissions from the first device to a second device of the network;
receiving, by the first device and from the second device, a second message;
determining, by the first device, fourth transmission parameters for third transmissions from the second device to the first device based at least in part on the second message; and
transmitting, by the first device and to the network coordinator device, a third message comprising the fourth transmission parameters.

12. The method of claim 11, further comprising:
receiving, by the first device and from the second device, a data transmission based at least in part on the fourth transmission parameters.

13. The method of claim 12, wherein the data transmission is received by the first device prior to transmitting a first probe to the second device and prior to receiving a second probe from the second device.

14. The method of claim 12, further comprising:
participating in a link maintenance operation; and
updating the first, second, third, and fourth transmission parameters based at least in part on the link maintenance operation.

15. The method of claim 12, wherein the data transmission is received over a shared transmission medium that comprises at least one of a coaxial transmission medium or a powerline transmission medium.

16. The method of claim 11, wherein the first and second resource allocation frames are received in subsequent resource allocation cycles.

17. The method of claim 11, further comprising:
receiving a third resource allocation frame that comprises the fourth transmission parameters.

18. A computer program product comprising instructions stored in a non-transitory computer-readable storage medium, the instructions comprising:
instructions to receive a first data transmission from a device using first transmission parameters;
instructions to enter a low power state after receipt of the first data transmission;
instructions to exit the low power state; and
instructions to receive, after exiting the low power state, a second data transmission from the device using second transmission parameters that differ from the first transmission parameters, wherein the second data transmission is a first transmission received from the device after exiting the low power state.

19. The computer program product of claim 18, wherein the first transmission parameters comprise different bitloadings for at least two subcarriers that are used to transmit the first data transmission and the second transmission parameters comprise a same bitloading for all subcarriers that are used to transmit the second data transmission.

20. The computer program product of claim 18, wherein the instructions further comprise:
instructions to transmit, prior to entering the low power state, an indication of an intent to enter the low power state to another device without transmitting the indication to the device.

* * * * *